US005615286A

United States Patent [19]
Patel

[11] Patent Number: 5,615,286
[45] Date of Patent: Mar. 25, 1997

[54] METHOD FOR DETERMINING A MOST LIKELY SEQUENCE OF STATES

[75] Inventor: Sarvar M. Patel, Montville, N.J.

[73] Assignee: Bell Communications Research, Inc., Morristown, N.J.

[21] Appl. No.: 436,059

[22] Filed: May 5, 1995

[51] Int. Cl.$^6$ ........................................ G06K 9/00
[52] U.S. Cl. ............................ 382/224; 382/229
[58] Field of Search ........................ 382/155, 156, 382/157, 158, 159, 160, 190, 209, 217, 218, 224, 226, 227, 228, 229, 230, 231, 181, 182, 185, 186, 187, 195, 198, 202, 203, 219, 220, 221, 225, 310; 381/43, 41; 395/22, 2, 2.41, 2.65, 23, 2.53, 2.54, 2.49

[56] References Cited

U.S. PATENT DOCUMENTS

| | | | |
|---|---|---|---|
| 4,827,521 | 5/1989 | Bahl et al. | 381/43 |
| 5,029,212 | 7/1991 | Yoshida | 381/43 |
| 5,050,215 | 9/1991 | Nishimura | 381/41 |
| 5,268,990 | 12/1993 | Cohen et al. | 395/2 |
| 5,307,444 | 4/1994 | Tsuboka | 395/22 |

OTHER PUBLICATIONS

Rabiner, "A Tutorial on Hidden Markov Models and Selected Applications in Speech Recognition", Proceedings of the IEEE, vol. 77, No. 2, Feb. 1989, pp. 257–286.

Forney, "The Viterbi Algorithm", Proceedings of the IEEE, vol. 61, No. 3, Mar. 1973, pp. 268–278.

S. Patel, "A Lower Complexity Viterbi Algorithm", 1995 ICASSP vol. 1, pp. 592–595, published on May 8, 1995, No Publisher.

Floyd, et al., "Expected Time Boundaries for Selection", Communications of the ACM, vol. 18, No. 3 pp. 165–173, Mar. 1975.

Austin et al., "Toward a Real-Time Spoken Language System Using Commercial Hardware", Proceedings DARPA Speech and Natural Language Workshop, pp. 72–77, Jun. 1990, No Publisher.

*Primary Examiner*—Leo Boudreau
*Assistant Examiner*—Bijan Tadayon
*Attorney, Agent, or Firm*—Joseph Giordano; James W. Falk

[57] ABSTRACT

The number of calculations to determine the most likely path is reduced by eliminating a number of paths that are impossible to provide an optimal result. How to eliminate these non-optimal paths, thus greatly reducing the number of calculations performed by a signal processor. The determination of the probability score of the best path to state s at time t may be found as follows. First, transition probabilities to state s are sorted in order of descending probability. Second, the k highest probability scores at time t−1 are identified. Third, the highest transition probability associated with the k highest probability scores at t−1 is identified and designated maxrank. Fourth, the k highest probability scores at t−1 are multiplied with their associated transition probabilities with the highest product being designated maxvalue. Fifth, all transition probabilities higher than maxrank are multiplied with their associated probability scores at t−1. If the product of one of these multiplications is greater than the current maxvalue, this product becomes the new maxvalue. The final maxvalue is multiplied by an observation probability to determine a most likely path sequence to state s at time−1. K is chosen to be $\sqrt{N}$, where N is the total number of possible states.

9 Claims, 10 Drawing Sheets

METHOD FOR DETERMINING A MOST LIKELY SEQUENCE OF STATES

FIELD OF THE INVENTION

The present invention is directed to an improved method and processor for determining the most likely path in Markov models and, more particularly, to a method and processor for reducing the number of calculations performed by a signal processor determining a most likely sequence of states, thus increasing the speed of the processor.

BACKGROUND OF THE INVENTION

Many electronic devices need to determine a "most likely" path of a received signal. For example, in speech, text, or handwriting recognition devices, a recognized unit (i.e., sound, syllable, letter, or word) of a received signal is determined by identifying the greatest probability that a particular sequence of states was received. This determination may be made by viewing the received signal as generated by a hide ten Markov model. A discussion of Markov models and hidden Markov models is found in Rabiner, "A Tutorial on Hidden Markov Models and Selected Applications in Speech Recognition", Proceedings of the IEEE, Vol. 77, No. 2, February 1989. Also, this signal may be viewed as generated by a Markov model observed through a "noisy" process. This is discussed in Forney, "The Viterbi Algorithm", Proceedings of the IEEE, Vol. 61, No. 3, March 1973. The contents of these articles are incorporated herein by reference.

Briefly, a Markov model is a system which may be described as being in any one of a set of N distinct states. At regularly surfaced time intervals, the system makes a transition between states (or remains in the same state) according to a set of transition probabilities. A simple three state Markov model is illustrated in FIG. 1.

Figure 1:
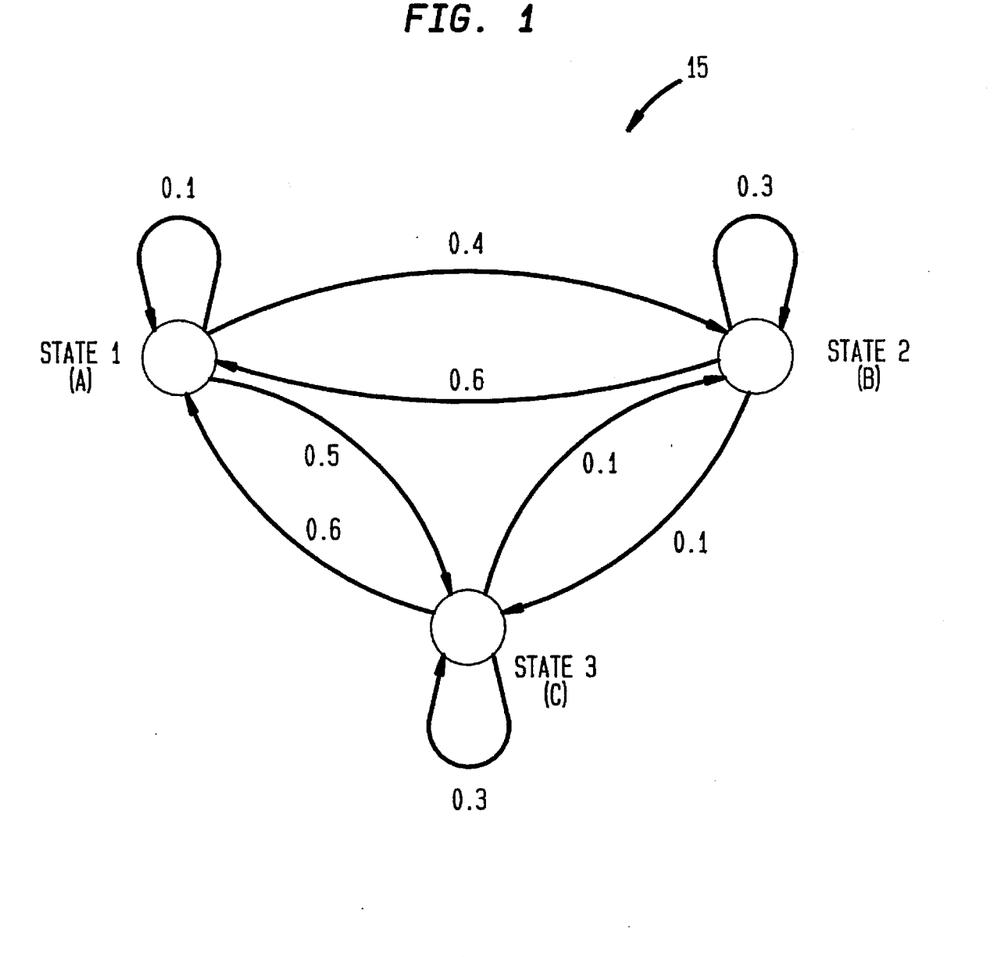
FIG. 1 is a three state Markov model.

FIG. 1 shows a three state transit ion model 15. In this model, it is assumed that any state may follow any other state, including the same state repeated. For each state, there is a known probability that it will follow any other state. For example, in the English language, this probability may be statistically determined by determining how often each letter is followed by another letter (or itself). In this illustration, assume that state 1 is the letter A, state 2 is the letter B, and state 3 is the letter C. Probabilities are assigned to the likelihood that any one of these letters will follow the same or another letter. In this example, an illustrative probability of 0.1 has been assigned to the likelihood that A will be followed by another A, 0.4 that A will be followed by a B, and 0.5 that A will be followed by a C. The same is done for the letters B and C, resulting in a total of nine probabilities. In this model, the state is apparent from the observation, that is, the state is either A, B, or C in the English language.

Often the states of the model generating the observations cannot be observed, but may only be ascertained by determining the probabilities that the observed states were generated by a particular model. For example, in the example of FIG. 1, assume that due to "noise", there is a known probability that in state A the symbol may be corrupted to appear to be a B, and a known probability that in state A the symbol will be corrupted to appear as a C. The same is true for B and C. To determine the best state sequence associated with the observations of this "noisy" state sequence, the text recognition device must determine, through probabilities, which letters are most likely to be in the sequence.

Figure 2:
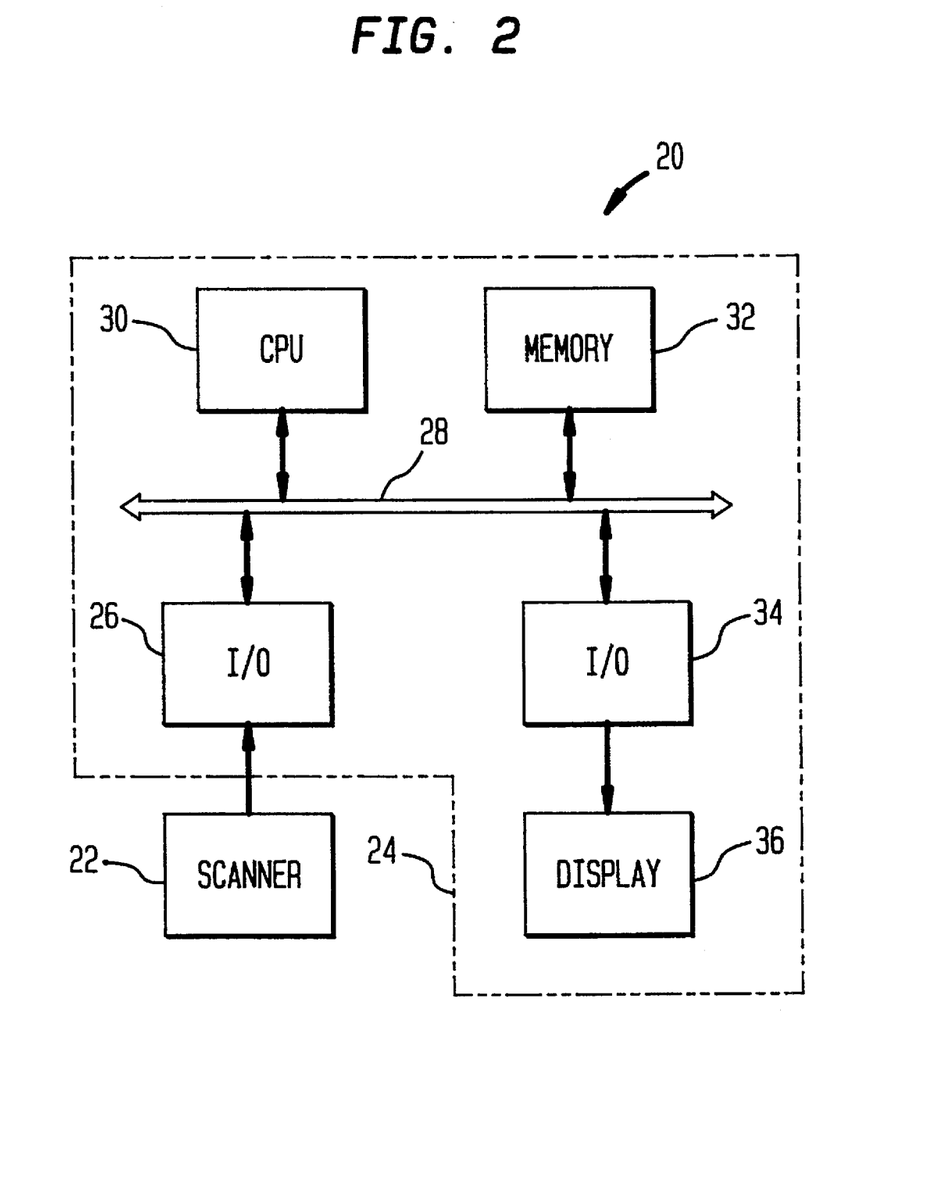
FIG. 2 is a block diagram of a text recognition device.

FIG. 2 is a block diagram of a text recognition device 20, comprising a document scanner 22 and a text recognition processor 24. The text recognition processor comprises a first input/output (I/O) device 26 connected to a bus 28. A central processing unit (CPU) 30, a memory 32 and a second input/output device 34 are also connected to the bus 28. The second input/output device may also be connected to a display device 36 such as a computer monitor or LCD display. The device 20 may operate as follows. A document is scanned in the scanner 22, which sends electronic information about the scanned document to the first I/O 26. The first I/O 26 sends the electronic information to the bus 28, which sends the information to CPU 30 for processing. The CPU 30 may retrieve instructions or other data from software residing in the memory 32, such as a random access memory (RAM). This information is delivered to the CPU via the bus 28. The CPU may also store some of the electronic information in memory 32. Once the text has been processed (i.e., recognized) the recognized text may be sent to the second I/O 34 for delivery to the display 36.

Figure 3:
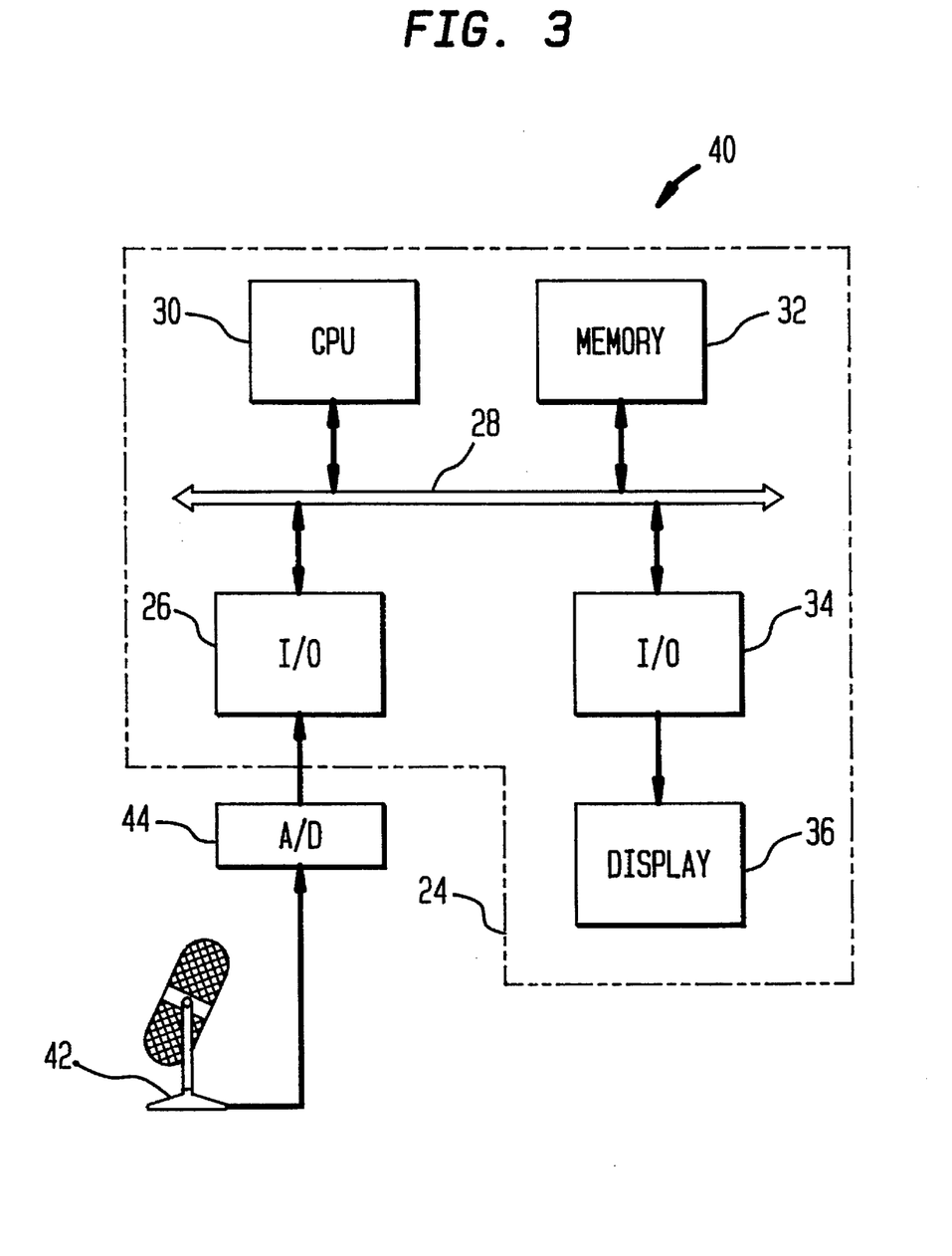
FIG. 3 is a block diagram of a continuous speech recognition device.

FIG. 3 is a block diagram of a continuous speech recognition device 40, comprising a microphone 42, an analog-to-digital (A/D) converter 44, and a speech recognition processor 24'. A speech signal may be detected by the microphone 42 and convened into a digital signal by A/D converter 44 for use by the speech recognition processor 24'. This processor 24' may have similar components as the text recognition processor 24, except different software resides in the memory 32. The detected speech signal is processed and a recognized utterance may be displayed by the display 36.

Figure 4:
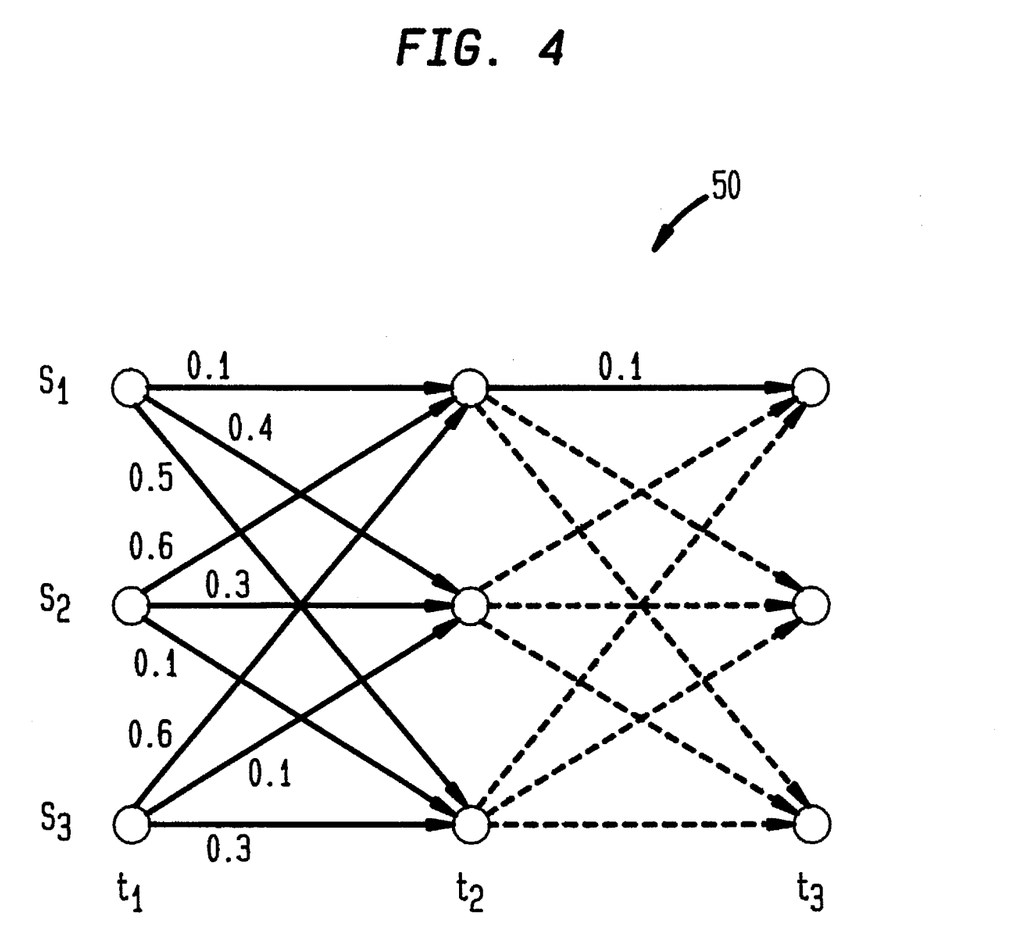
FIG. 4 is a lattice for a three-state system at time 13.

In this continuous speech recognition device 40, for example, the probability that observed sounds and/or words at a particular time are a particular state is reached by considering three probabilities described in relation to FIG. 4. FIG. 4 illustrates a three state lattice 50 at a third time period $t_3$. The probability that an observation is in state s at time t is made as follows. There are N possible paths which may reach state s at time t (for example, $s_1$ at time $t_3$ in FIG. 4). That is, them is a possible path ending at each state at time t–1 (i.e., states $s_1$, $s_2$, $s_3$ at time h in FIG. 4). Each of these paths has a probability assigned to it that it is the most likely path so far. This is called the probability score. The probability score for each state at time t–1 is multiplied by the known transition probabilities for state s to determine the total probability that that path is likely to have transitioned to state s at time t. The maximum of these products is taken and multiplied by an observation probability to determine the probability that state s was observed at time t.

This probability for determining the best path from the initial time period to the current time period may be expressed as:

$$p[s,t]=max(p[ps,t-1]*b[ps,s])*P[O_{t,s}] \text{ for } ps=1,2,\ldots N$$

where:
s is the current state;
ps is the previous state;
p[s,t] is the probability score of the best path ending at state s at time t;
p[ps,t–1] is the probability score of the best path ending at state ps at time t–1;
b[ps,s] is the known probability of the state ps preceding state s (this is state transition probability;
$p[O_{t,s}]$ is the observation probability for current state s at times t; and N is the total number of states.

It may be observed from FIG. 4 that to determine the most likely state path for each possible state at time t (i.e., states $s_1$, $s_2$, $s_3$ of FIG. 4) max(p[ps,t−1]* b[ps,s]) must be calculated $N^2$ times per time interval. For this illustrative example where N=3, nine expressions need to be evaluated. In the speech recognition system of FIG. 3, for example, this calculation may be performed several times to determine a single spoken phrase. This calculation may be performed at each time interval using a hidden Markov model, which models phonemes or words, to determine the most likely state sequence at time t. Furthermore, it may be performed again to determine if, in context with surrounding words, the detected word was probably the uttered word. In an actual signal processor, such as the continuous speech recognition system of FIG. 3, the number of possible words may be on the order of 1000. Thus, a single best path calculation may require as many as 1,000,000 calculations (i.e., $1000^2$) per time interval. Thus, it may take several million calculations to recognize a single sentence.

Previous attempts at reducing the number of calculations to determine the best state sequence have been suboptimal. For example "pruning" has been suggested as a method for reducing the number of calculations. Pruning is a process where only the most probable "branches" of the lattice are thoroughly investigated, and less probable "branches" are "pruned". This process is suboptimal because it abandons "branches" that begin as less probable, but which several states later may begin to appear as highly probable. For example, in an illustrative model of an English language text recognition device consisting of 26 letters it is unlikely, but not impossible, for an A to be preceded by an A. Thus, a suboptimal solution may prune this state sequence. However, if the word "aardvark", for example, is considered, an incorrect result would probably occur.

Therefore, it is an object of the present invention to provide a method and device for reducing the average number of calculations needed for a best path calculation without sacrificing optimality.

SUMMARY OF THE INVENTION

This and other objects are achieved by a method and device for determining a most likely sequence of states according to the present invention. The expected number of calculations to determine the most likely path is reduced by eliminating a number of paths that are impossible to provide an optimal result. The present invention provides a method for determining how to eliminate these non-optimal paths, thus greatly reducing the expected number of calculations performed by a signal processor.

In the inventive method, a sequence of observations from an initial time to a time t are received and compared with known parameters for a finite number of states. Best state sequences for each state at time t−1 are determined based on this comparison. A number of these sequences (less than the total number of states) at the time t−1 which are likely to provide an optimal state sequence for each states s at t are identified for processing. The number of best state sequences are identified so that one of the sequences will provide an optimal state sequence for s at t. At a final time interval, the processed sequence with the optimal result is selected as the most likely sequence of states for output.

In one preferred embodiment, the determination of the probability score of the best path for state s at time t for a number of observations from an initial time to time t may be found as follows. First, transition probabilities of transitions to state s are sorted in order of descending probability. Second, the k highest probability scores at time t−1 are identified. Third, the highest transition probability associated with the k highest probability scores is identified and designated maxrank. Fourth, the k highest probability scores are multiplied with their associated transition probabilities with the highest product being designated maxvalue. Fifth, all transition probabilities higher than maxrank multiplied with their associated state probability scores at t−1. If the product of one of these multiplications is greater than the current maxvalue, this product becomes the new maxvalue. The final maxvalue is multiplied by an observation probability to determine a most likely path sequence ending in state s at time t.

In a preferred embodiment, k is chosen to be $\sqrt{N}$, where N is the total number of states.

BRIEF DESCRIPTION OF THE INVENTION

The present invention is described with reference to the following drawings.

DETAILED DESCRIPTION OF A PREFERRED EMBODIMENT

Figure 5:
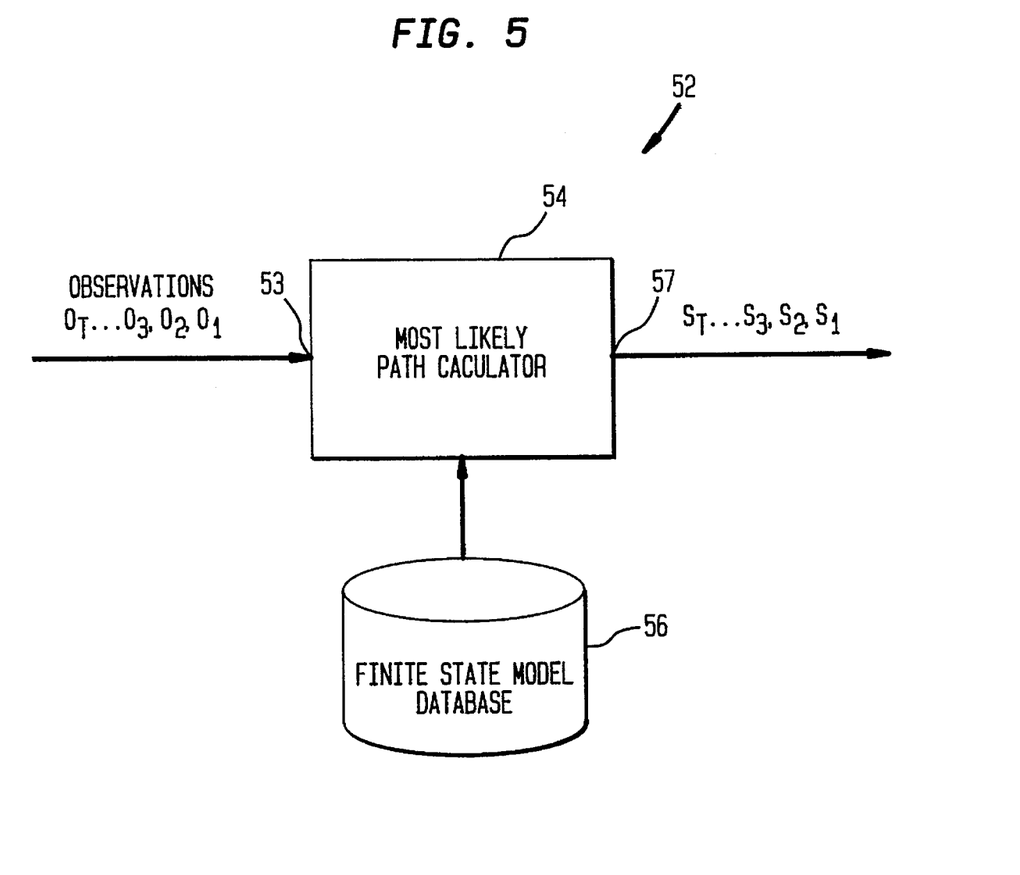
FIG. 5 is a block diagram of a most likely path signal processor according to the present invention.

FIG. 5 is a simplified block diagram of a most likely state sequence signal processor 52 according to the present invention. A set of observations $O_1, O_2, \ldots, O_T$ are received at an input 53 of a most likely path calculator 54. Referring to FIG. 3, the observations could be a set of sounds received by the microphone 42 and converted into digital information by the A/D converter 44. The most likely path calculator 54 consults a finite state model database 56. The database 56 contains the parameters of the model which include the number of states, initial state probabilities (i.e., the probability that a state is the state observed at time h), the state transition probabilities, and observation probability functions for each state. Again referring to FIG. 3, the finite state model database may be data stored in the processor's 40 memory 32. A sequence of recognized states $S_1, S_2, S_3, \ldots, S_N$ is output from an output 57 of the most likely path calculator 54. The output may also include a probability score for the sequence of recognized states. These recognized states and/or score may be used for further processing (i.e., such as determining if these states form a recognized word or phrase), may be stored in memory 32, or may be sent to an I/O 34 to a display 36 (see FIGS. 2, 3).

Figure 6A:
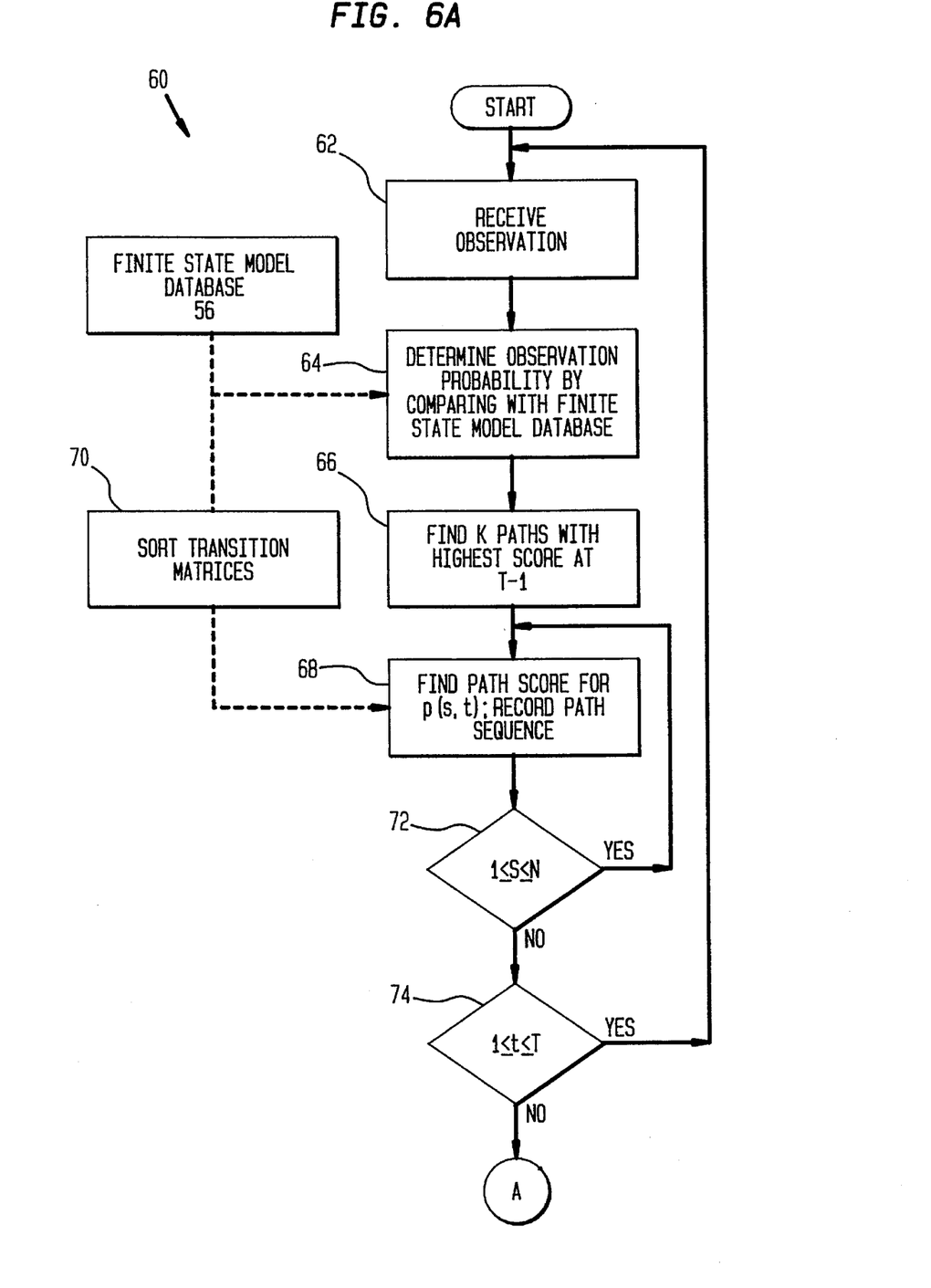
FIGS. 6a and 6b are a flow chart of a preferred process performed by the most likely path calculator of FIG. 5.
Figure 6B:
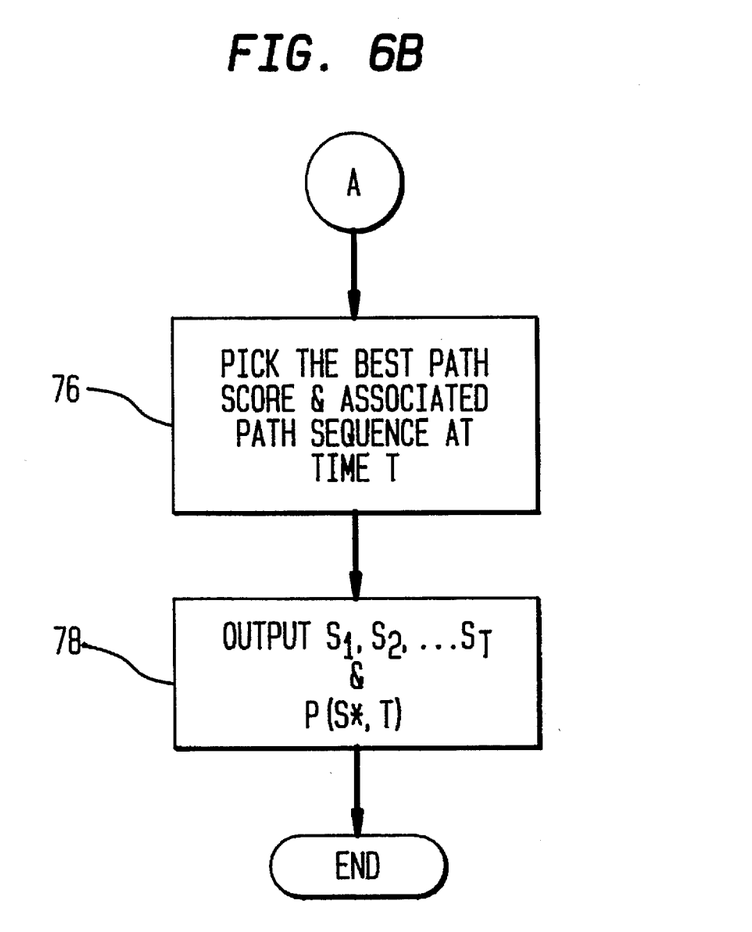

FIGS. 6a and 6b are a flow chart illustrating a preferred method 60 for determining the most likely state sequence. The most likely path calculator 54 receives observations (i.e., sound features, scanned text, or handwritten characters) (step 62). Each received observation is compared by the CPU 30 with values in the finite state model database 56 to determine an observation probability (step 64). In this step, the observation probability function for each state is used to determine the observation probability for each state.

Next, the CPU 30 determines the k paths having the highest p[ps, t–1] probability scores (step 66). A preferred method of performing this step is disclosed in Floyd et al., "Expected Time Bounds for Selection," Communications of the ACM, Vol. 18, No. 3 March 1975. Once the k paths having the highest p[ps, t-1] probability scores are determined, the CPU 30 determines the best p[s,t] probability score for the best path ending at state s at time t (step 68). Step 68 is performed by the CPU 30 which compares the scores with the transition probabilities (which are stored in the finite state model database 56, which may be found in memory 32) of a state ps at t–1 preceding a state s at time t. For reasons which will be made apparent, the transition probabilities are sorted in value order. Because these probabilities are known, as discussed above in relation with FIG. 1, the CPU 30 may perform this sort only once (step 70). The sorted values for the transition probabilities for each of the N states may be presorted and stored in the finite state model database 56 and/or memory 32.

Step 68 finds the best path score (i.e., p[s,t]) for state s at time t. This step is explained in detail below. Step 68 is repeated for all N states (step 72), that is p[s,t] is determined for all N states at time t. After the path score determination is repeated for every state, then steps 62–72 are repeated for every time from the initial time period to the final time period T (step 74).

Next, the best path score and associated most likely path sequence at final time T are determined (step 76). This is done by the CPU 30, which selects the path having the highest score determined by steps 64–74. The state sequence of this most likely path are output at the most likely path calculator output 57 as the recognized states (i.e., the recognized utterance, letter, or word) (step 78). The output states may be stored in memory 32, sent to an I/O 34 for delivery to a display 36, or retained in the CPU 30 for further processing.

Figure 7:
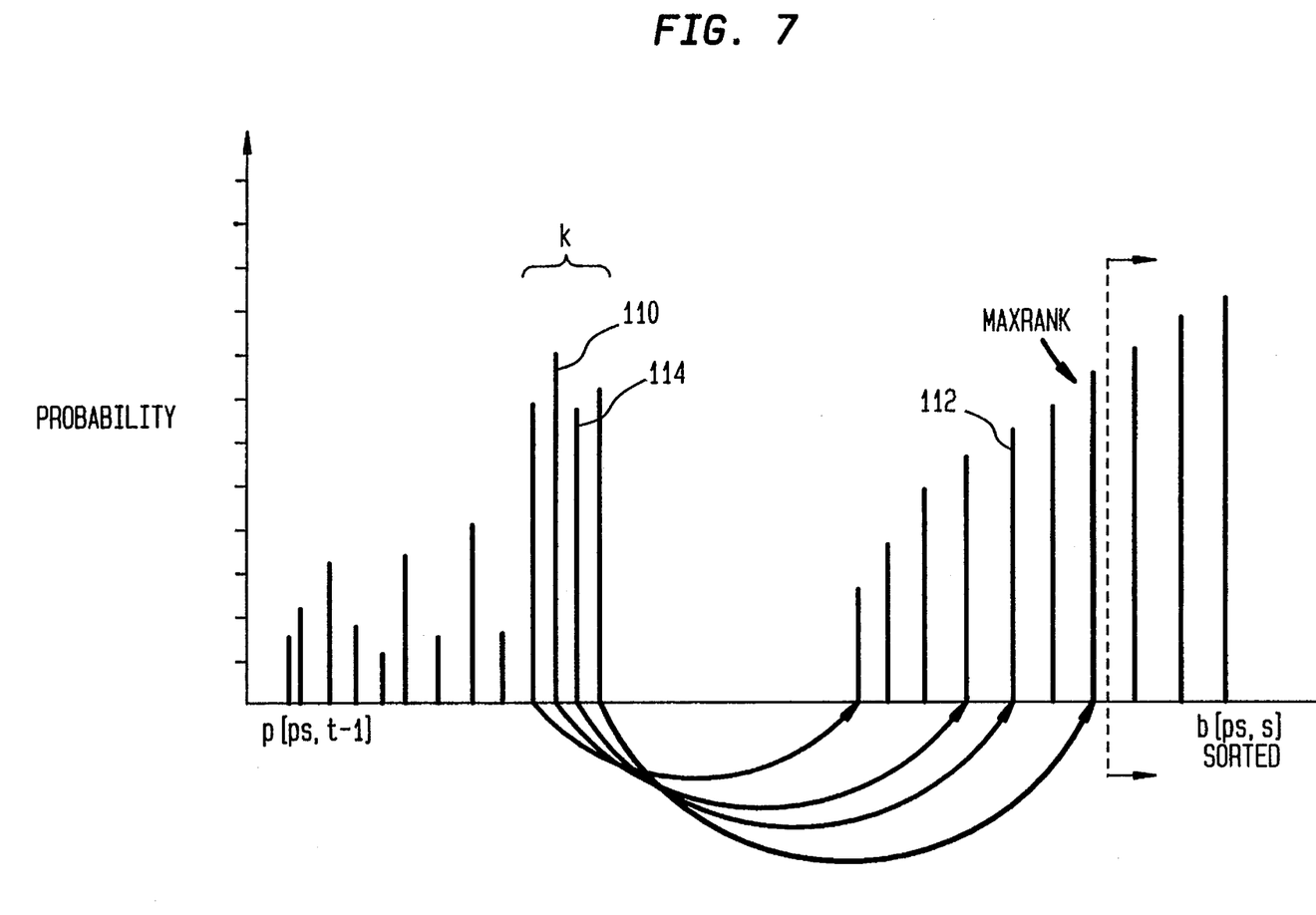
FIG. 7 is a chart illustrating how determining only the k highest paths provides an optimal solution.

FIG. 7 illustrates why only k values need to be considered. On the left of the figure are edges which represent p[ps, t–1] probability scores. These values are not sorted, but the CPU identifies the k greatest scores. In this figure, these k values are arranged at the right end of the p[ps, t–1] values. The CPU matches the k values with the associated transition probabilities (e.g., the edges found on the right side of FIG. 7) that these states transition to state s at time t. The highest transition probability of these matched probabilities is designated maxrank. The CPU 30 multiplies the k greatest probability scores with their associated transition probabilities to determine which of these products is the greatest. This greatest product is designated maxvalue, and the corresponding state path is saved in memory 32 (see FIGS. 2,3) as the current most likely path. Note that the product of any of the k values and its transition probability may be greater than the product associated with maxrank. For example, in FIG. 7, the product of p[ps, t–1] value 110 multiplied by transition probability 112 may be greater than the product of p[ps, t–1] value 114 multiplied by the transition probability for maxrank.

Once all of the k p[ps, t–1] scores have been multiplied with their associated transition probabilities, the only possible p[ps, t–1] scores which could result in products greater than maxvalue are those scores associated with transition probabilities greater than the transition probability of maxrank (as indicated by the dashed lines in FIG. 7). This is because there is no combination of lower p[ps, t–1] scores (all of which are lower than any of the k highest scores) multiplied by a lower transition probability than maxrank which can result in a product greater than maxvalue. Thus, only the transition probabilities greater than maxrank could possibly produce a product greater than the current maxvalue. It is preferred that k be selected so that it is statistically likely that the fewest number of products are evaluated. A preferred value for k is discussed below.

Figure 8A:
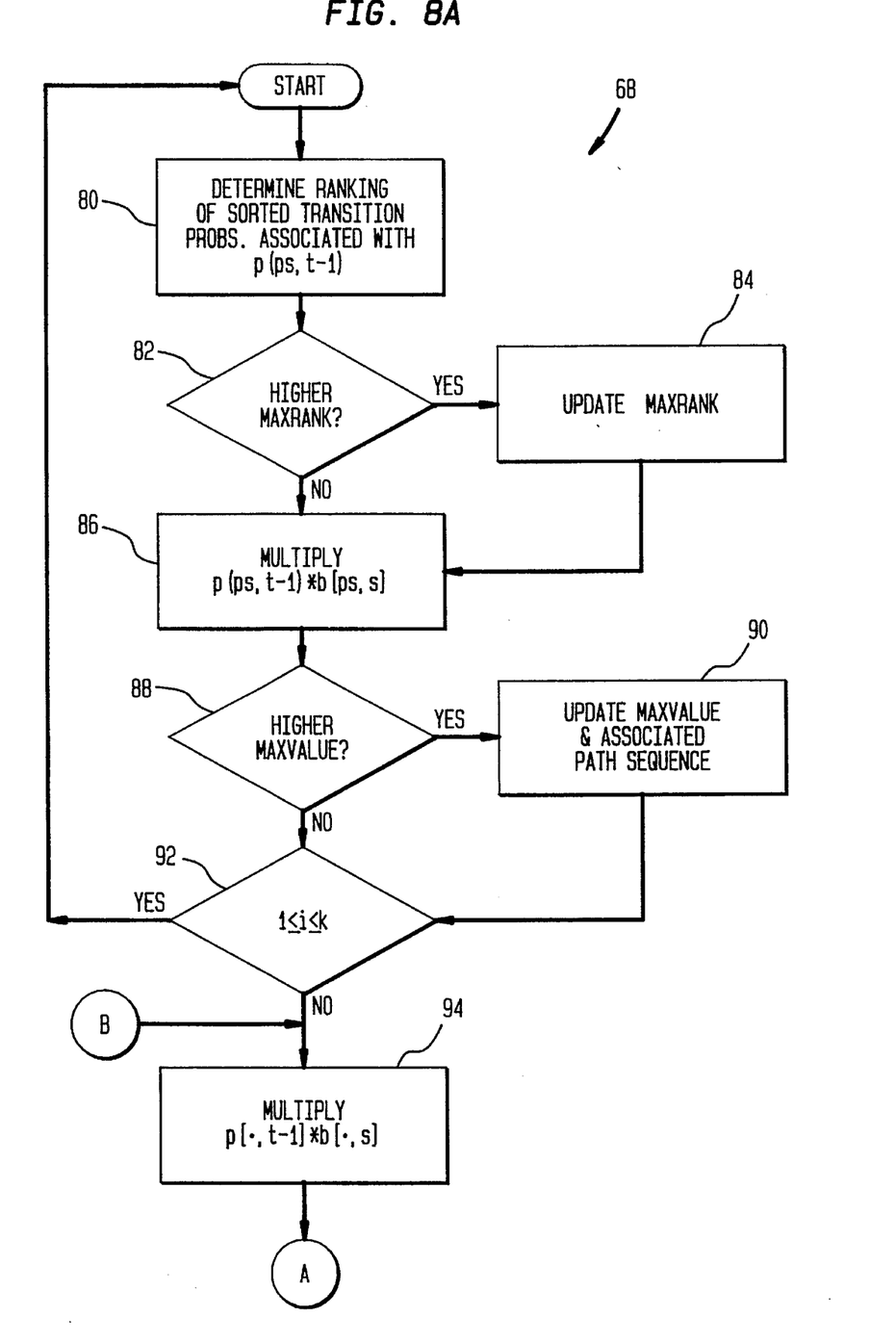
FIGS. 8a and 8b are a flow chart of a preferred process for finding k paths having a highest probability score.
Figure 8B:
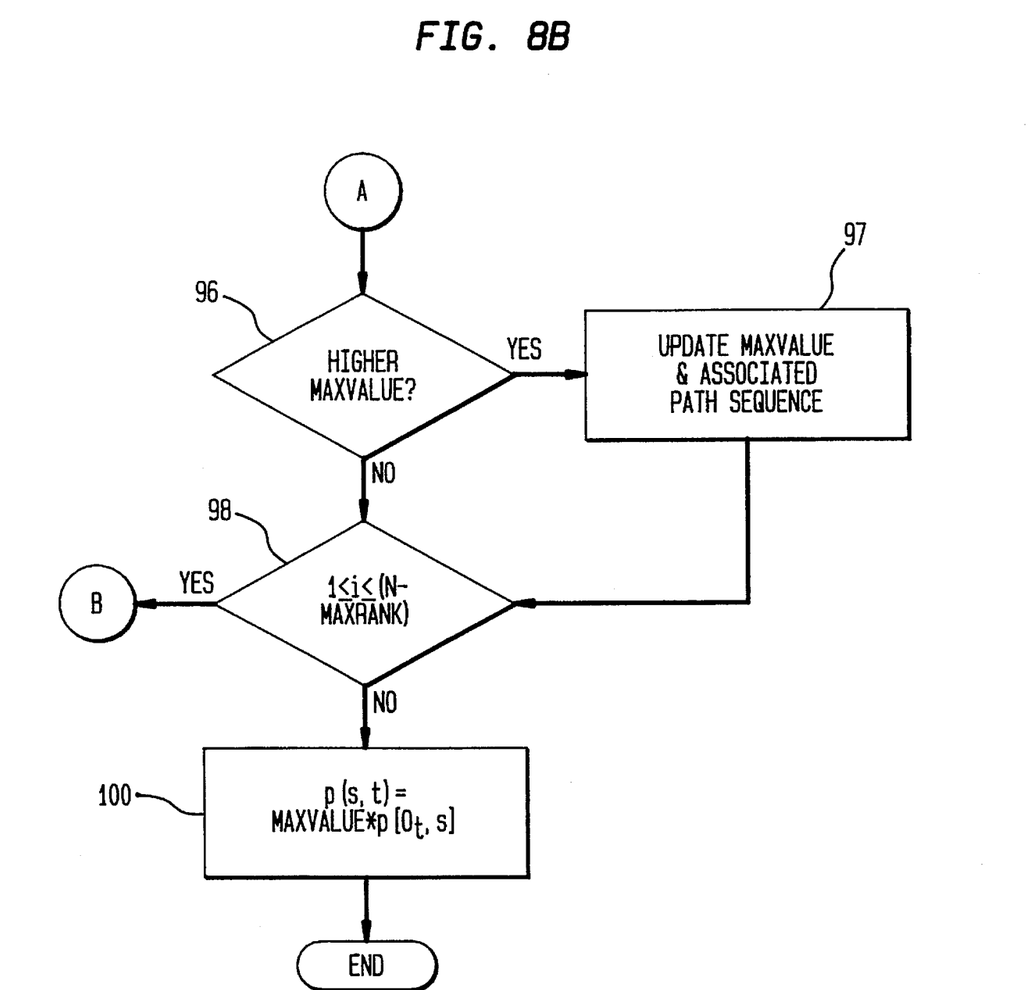

FIGS. 8a and 8b are a flow chart of how the path score for p(s,t) (step 68) is determined. First, the CPU compares the k highest p[ps, t–1] scores (already determined in step 66) with their respective sorted transition probabilities (step 80). The highest of these transition probabilities is designated "maxrank". The maxrank value is stored in the memory (element 32 in FIGS. 2, 3)(step 84). If the currently considered transition probability is the highest one considered so far, it replaces the previous maxrank in memory (step 82). The score is then multiplied by its respective sorted transition probability (step 86). The highest of these products is designated the "maxvalue". If the currently considered product is greater than the greatest product considered so far, it replaces the previous maxvalue in memory (step 88). If the product is a new maxvalue, this product and its associated path are stored in the memory (step 90).

Steps 80 through 90 are repeated for the each of the k highest p[ps, t–1] scores (step 92). The processing continues as follows. Maxrank is found on a location of the sorted transition probabilities. As described above, because the maxrank is the highest product of the highest k p[ps, t–1] scores, there is no combination of lower p[ps, t–1] values multiplied by transition probabilities less than the maxrank transition probability that can be greater than maxvalue. Thus, only the transition probabilities greater than maxrank that could possibly produce a product greater than maxvalue.

Continuing with FIG. 8a, a transition probability greater than maxrank is multiplied by the associated p[ps, t–1] score (step 94). This product is compared to maxvalue (step 96) and if the score is greater than the maxvalue determined by multiplying the/c values by the transition probabilities, then this new product and associated path sequence are stored in memory 32 (step 97). This is repeated for all N - maxrank transition probabilities above maxrank (step 98). After all of the N-maxrank values have been considered, the final maxvalue is multiplied by the observation probability for the current state to determine the most likely path (step 100).

The inventor has found that a preferred value for k is the $\sqrt{N}$. The derivation of this preferred value is found in S. Patel, "A Lower Complexity Viterbi Algorithm", 1995 ICASSP (International Conference on Acoustics, Speech, and Signal Processing) Vol. 1, pp. 592–595, published on May 8, 1995. The contents of this article are incorporated herein by reference. Therefore, in a preferred embodiment, the expected number of calculations per time interval to determine the maximum p[s,t] probability score for the best path is on the order of N $*\sqrt{N}$ rather than $N^2$. In a 1000 state model, for example, $1000_2=1,000,000$; $1000*\sqrt{1000}=31,622$. Thus, significantly fewer calculations are performed without any reduction in the optimality of the solution. It is possible in a worst case scenario that the inventive method will perform on the order of $N^2$ calculations. Other values for k may also be used.

This method has been found to be particularly effective for reducing the number of calculations for determining the most likely state sequence in models where every state may follow any other state, including itself. This is called a "fully connected" model, such as is shown in FIGS. 1 and 4. This method will provide a correct result (i.e., the highest probability state sequence) for all models; however, the advantages provided by the invention may not be fully realized in models which are not fully connected.

In conclusion, an improved method and device for determining a most likely sequence of states is provided. The inventive method greatly reduces the number of calculations made in determining the most likely sequence from on the order of $N^2$ to $N*\sqrt{N}$ in a preferred embodiment. The inventive method and device have many applications. Some of these applications include text and handwriting recognition, continuous speech recognition, convolutional encoding, and digital communications.

The above described embodiments of the invention are intended to be illustrative only. Numerous alternative embodiments may be devised by those skilled in the art without departing from the spirit and scope of the following claims. For example, a person skilled in the art recognizes that sums, rather than products, may be used to calculate the path scores; that steps of the disclosed method may be performed in a different sequence; and that observations may be processed at each time interval or as an entire set.

I claim:

1. A method for determining the most likely state sequence ending in a state s at a time t corresponding to a sequence of observations from an initial time interval to time t, comprising the steps of:
   a. receiving the sequence of observations;
   b. comparing the observations to known parameters for N number of states;
   c. determining a best state sequence for each of the N number of states at time t–1 based on this comparison;
   d. identifying a first number of the best state sequences at t–1, the first number being less than N, one of which sequences will provide an optimal state sequence to s at time t;
   e. processing only the first number of the best state sequences; and
   f. selecting an optimal state sequence from the processed best state sequences; and wherein the step of determining comprises determining the best state sequences by iteratively calculating the most likely state sequences for each of the N states from the initial time to time t–1.

2. The method of claim 1, wherein the step of comparing further comprises comparing each observation to an observation probability function for each of the N states to determine an observation probability for each state for each observation.

3. The method of claim 1, wherein the step of identifying comprises the steps of:

a. sorting transition probabilities to state s in order of descending probability;
   b. selecting k highest probability state sequences from the best state sequences of the N states at time t–1;
   c. designating as maxrank the highest rank of the transition probabilities associated with the k highest probability best state sequences at time t–1; and
   d. identifying all transition probabilities higher than maxrank.

4. The method of claim 3, wherein the step of processing comprises:
   a. multiplying the k highest probability state sequences at t–1 with their associated transition probabilities; and
   b. multiplying all transition probabilities higher than maxrank with their associated state sequences at t–1.

5. The method of claim 4, wherein the step of selecting comprises selecting a final state sequence associated with a highest product after all multiplications have been performed.

6. A method for determining a most likely state sequence at a time t for a state s in a system having N possible states, comprising the steps of:
   a. receiving a number of observations from an initial time to time t;
   b. sorting a plurality of transition probabilities to state s associated with the N states in order of descending probability;
   c. identifying k highest state probability scores among the N states at a time t - 1;
   d. designating as maxrank a highest transition probability associated with the k highest state probability scores at time t–1;
   e. multiplying the k highest state probability scores at time t–1 with their associated transition probabilities;
   f. designating as a current maxvalue a highest product of this multiplication;
   g. multiplying all transition probabilities higher than maxrank with their associated state probability scores;
   h. replacing the current maxvalue with a new maxvalue if a product of one of the multiplications of a transition probability higher than maxrank is greater than the current maxvalue.

7. The method of claim 6, further comprising the step of multiplying the final maxvalue by an observation probability for state s at time t.

8. The method of claim 6, wherein steps d–h are repeated from each of the N states.

9. The method of claim 6, further including the step of choosing k to be an inteqer solution close to $\sqrt{N}$.

* * * * *